United States Patent [19]

Henits et al.

[11] Patent Number: 5,446,603
[45] Date of Patent: Aug. 29, 1995

[54] METHOD OF RETRIEVING MESSAGES AT SELECTED TIMES FROM A DIGITAL AUDIO TAPE

[75] Inventors: John Henits, Bethel; Robert B. Swick, Stratford, both of Conn.

[73] Assignee: Dictaphone Corporation, Stratford, Conn.

[21] Appl. No.: 171,286

[22] Filed: Dec. 21, 1993

[51] Int. Cl.⁶ .................... G11B 5/09; G11B 5/596
[52] U.S. Cl. .................... 360/48; 360/73.05
[58] Field of Search .............. 360/32, 48, 51, 77.02, 360/77.04, 72.02, 72.04, 78.04, 78.05, 78.06, 78.08, 73.05

[56] References Cited

U.S. PATENT DOCUMENTS

| | | | |
|---|---|---|---|
| 3,727,203 | 4/1973 | Crossman | 340/174.1 |
| 4,199,820 | 4/1980 | Ohtake et al. | 365/234 |
| 4,297,734 | 10/1981 | Laishley et al. | 360/78.06 X |
| 4,547,822 | 10/1985 | Brown | 360/78.06 |
| 4,882,640 | 11/1989 | Kakii | 360/73.05 |
| 4,958,244 | 9/1990 | Inazawa et al. | 360/72.1 |
| 4,989,101 | 1/1991 | Sasho | 360/72.1 X |
| 5,021,896 | 6/1991 | Honino | 360/70 |
| 5,210,851 | 5/1993 | Kato et al. | 395/425 |
| 5,216,647 | 6/1993 | Kitani | 360/78.06 X |
| 5,235,476 | 8/1993 | Mikada et al. | 360/73.08 |
| 5,268,804 | 12/1993 | Wallis | 360/78.04 |
| 5,339,203 | 8/1994 | Henits et al. | 360/39 |

*Primary Examiner*—Donald Hajec
*Assistant Examiner*—Thien Minh Le
*Attorney, Agent, or Firm*—Ronald Reichman; Melvin J. Scolnick

[57] ABSTRACT

A scheme has been devised for retrieving audio for a selected time from a digital audio tape that has been used in a device such as a digital logger wherein audio is recorded on a intermittent basis. A record session table is created on the digital audio tape that correlates the time of recording sessions to of the location on the DAT for a selected time of recording.

6 Claims, 3 Drawing Sheets

FIG. 2
RECORD SESSION TABLE

|  | DATE | START TIME | END TIME | CHANNELS IN RECORD | STARTING FILEMARK # |
|---|---|---|---|---|---|
| RECORDING SESSION 1 | 9-23-93 | 1:00:00 | 2:00:00 | 1-32 | 001 |
| RECORDING SESSION 2 | 9-23-93 | 4:00:00 | 11:00:00 | 1-11  13-32 | 601 |
| RECORDING SESSION 3 | 9-23-93 | 13:00:00 | 15:00:00 | 1-32 | 4801 |
|  |  |  |  |  |  |
|  |  |  |  |  |  |
|  |  |  |  |  |  |
|  |  |  |  |  |  |
|  |  |  |  |  |  |

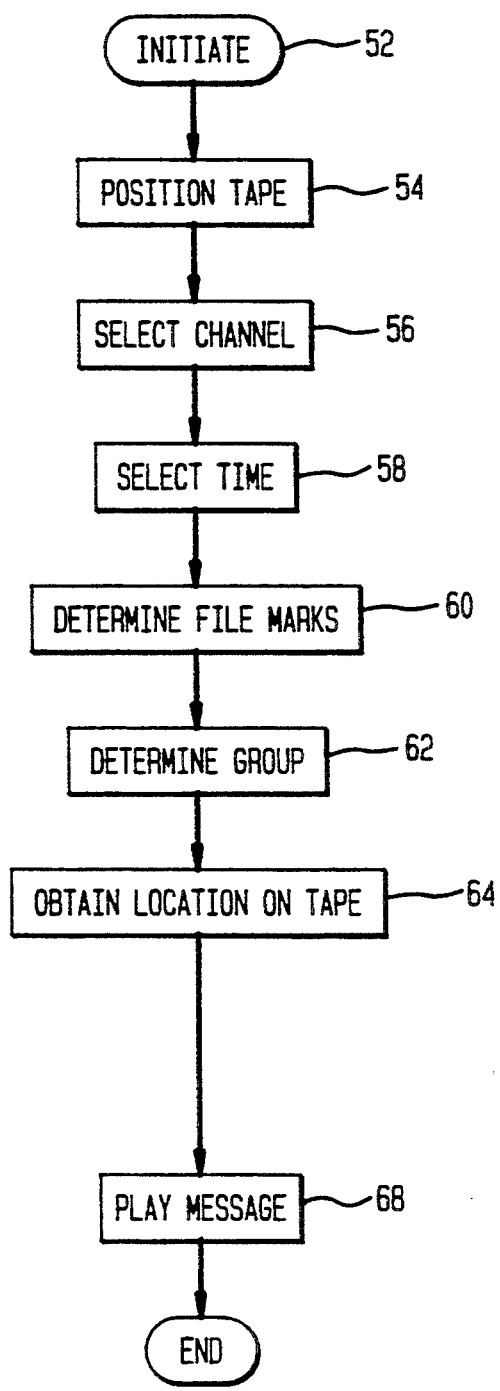

METHOD OF RETRIEVING MESSAGES AT SELECTED TIMES FROM A DIGITAL AUDIO TAPE

BACKGROUND OF THE INVENTION

Audio loggers are known devices that are used for the purpose of preserving records of voice communication on a medium such as a tape. They have particular use in police stations, hospitals, prisons, brokerage houses and other locations where there is a need to record a message or conversation and the time and date thereof. The tapes upon which audio is written are stored for archival purposes should the need arise to retrieve a message.

Recently, digital loggers that use digital audio tapes (DAT's) have become commercially available. As with any other recording medium used in a logger, or similar device, a scheme must be provided for the purpose of retrieving audio from the DAT in a reliable and fast manner. Unless there is a scheme whereby the location of audio that was recorded at a selected time can be determined on the tape, the entire tape must be played to retrieve the audio. In the past, schemes have been provided wherein a medium is played at high speed and upon the detection of the audio, the tape is operated at normal speed and the audio is played back. Although this scheme works well, it does require that the medium be scanned, thereby consuming an unnecessary amount of time. In addition, prior schemes did not provide a satisfactory manner for finding the presence of a message corresponding to the particular time the message was recorded.

SUMMARY OF THE INVENTION

A novel method for the searching of a digital audio tape (DAT) for the purpose of retrieving audio that was recorded at a particular time has been conceived that saves time and is reliable. The instant invention allows one not only to find a message quickly. The average search time is 35 seconds and the search granularity is 1.2 seconds in the preferred embodiment of the instant invention. The DAT is divided essentially into two sections, one section being referred to as a primary partition and the second section being referred to as the secondary partition. Audio is written into the primary partition by a scheme that uses a plurality of frames, each frame including a file mark that divides the tape into time increments, such as six seconds, followed by a header and a number of audio groups where the audio is written from a number of audio sources, i.e. channels. The header includes an audio block table that indicates where and whether audio is present on the channels from which audio is received and the groups in which the audio had been written. The audio block table includes every channel of each group. Thus, as a DAT is operated, data will be written into the audio block table that will indicate whether audio has been received and where in the frame the audio is stored. After an audio recording session is completed, data reflecting periods that the recorder is enabled is written into a record session table that is stored in the secondary partition. The record session table stores a history for all recording sessions in which the logger recorded. In essence, the record sessions table in the secondary partition is an accumulation of all the recording session for all enabled channels during such recording sessions for the DAT.

The method involves searching the record session table of the secondary partition of the DAT for a selected time and channel. Since each file mark represents six seconds, a location on the tape can be determined by counting the number of the file marks representing the beginning time for the recording session to the target time of the message and positioning the tape to the appropriate file mark that represents the target time.

BRIEF DESCRIPTION OF THE DRAWING

FIG. 2 is a representation of a record session table stored in the secondary partition of the DAT shown in FIG. 1; and FIG. 3 is a flow chart representing a program for positioning a DAT for playback at the user's specified target time.

DETAILED DESCRIPTION OF THE PREFERRED EMBODIMENT

Figure 1:
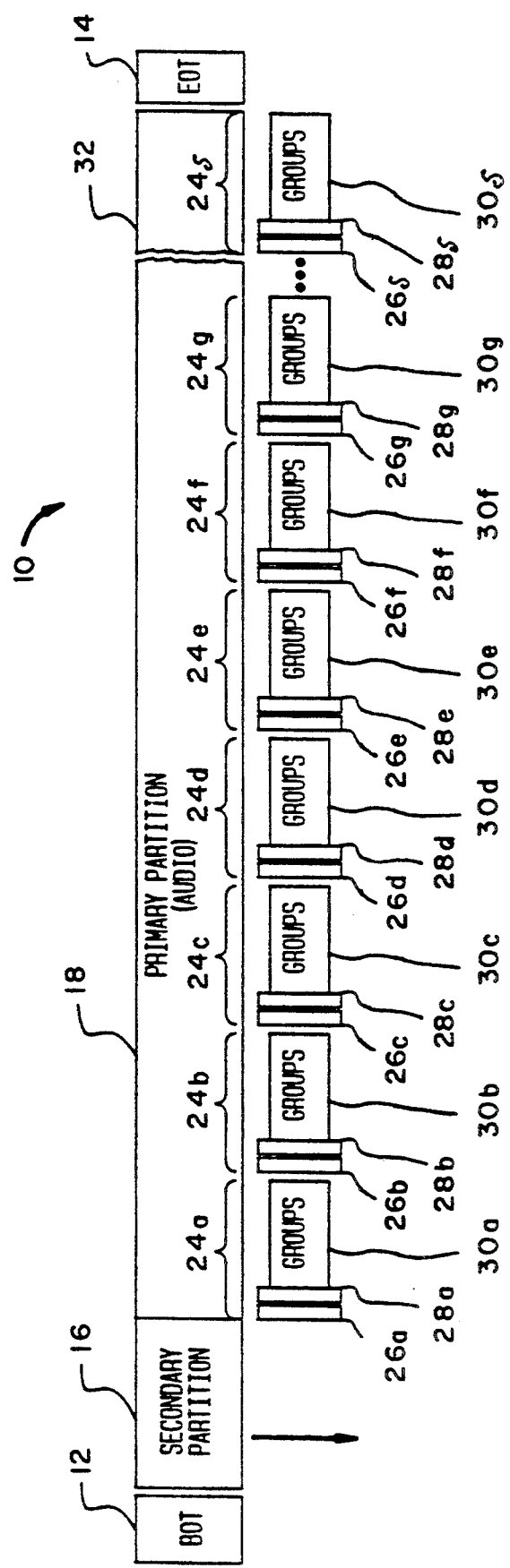
FIG. 1 is a plan view of a digital audio tape (DAT) demonstrating various portions of the DAT.

A scheme has been devised whereby audio, i.e. recorded voice, can be retrieved quickly and conveniently from a digital audio tape (DAT) for a given time or period. Audio can be either in the form of a conversation or a message that is given by a single party or there may be silence as a result of absence of audio, hereinafter referred to collectively as a message in both the disclosure and accompanying claims. It will be appreciated that there will be instances when it becomes necessary to determine if there is an absence of audio on a tape. For greater details of a system in which a DAT records audio, reference can be had to copending U.S. patent application Ser. No. 08/100,401 entitled Method and Apparatus for Storing Data on a Digital Audio Tape.

With reference now to FIGS. 1 and 2, a representation of a DAT that incorporates the instant invention is shown generally at 10 and has a beginning of the tape (BOT) 12 and an end of the tape (EOT) 14. Adjacent to the BOT 12 is a secondary partition 16. The secondary partition 16 can include information such as the media format, manufacture's identification, product identification in terms of model number of the recorder that formatted the DAT, the tape drive vendor, logic unit type, unit software version, an indication whether the tape is an original or a copy, and other information of this type. In addition, the secondary partition stores a record session table which will be described in greater detail with reference to FIG. 2. Intermediate the secondary partition 16 and the EOT 14 is the primary partition 18 in which audio is recorded from a number of channels, as for example thirty two channels. Needless to say, the primary partition 18 is by far the largest portion of the DAT 10.

The primary partition is made up of a number of frames 24a-24g, each frame including a file mark 26, a header 28 and a plurality of groups 30, five groups being the preferred number. Each file mark 26 represents six seconds of time all channels being recorded during that six seconds. Each group is allocated 1.2 seconds of recording and each group is capable of receiving audio from all channels during its allotted 1.2 seconds. It will be appreciated that amount of recording between file marks 26 can vary, but the time between file marks always represents six seconds. The header 28 has generated therein an audio block table 32 that manifests the recording of data, or absence of data, in each channel of each group 30. A "0" bit indicates the lack of audio on a particular channel in a group and a "1" bit represents the presence of audio. A group boundary multiplier 34 is also included in the header so as to indicate the number of channels active in the groups. The group boundary multiplier serves as a mechanism for allowing one to quickly find audio in a given frame during playback.

With reference now to FIG. 2, a record session table is shown generally at 40 that is stored in the secondary partition 16 of the DAT 10. Such a table 40 indicates the date 42 start time 44 of a recording session 41, the end time 46, identification of the voice channels enabled for recording 48 during the recording session and the starting file mark number 50. The start and end times are given in hours: minutes: seconds.

It will be appreciated that a DAT will be placed into the logger 110, or a play back device, such as a digital record module, which has a programmed processor that is programmed in a way that is illustrated by the flow chart in FIG. 3. The data in the record session table stored in the secondary partition of the DAT is copied into the memory of the playback device, which memory is preferable random access storage. During the search for a message, the memory in the playback device is relied upon. Once the position for a selected time is determined through use of the record session table and distinguishing of the file marks, the translation to the physical location on the tape can be made.

With reference to the flow chart shown in FIG. 3, the method of operation in which a message on a particular channel at a particular time can be retrieved will be described. A DAT is inserted into a digital logger or other appropriately programmed playback device to initiate operation 52. It will be assumed that the record session table has been transferred from the secondary partition of the DAT into the memory of the playback device. The tape is positioned 54 to the start of the primary partition 18 and a particular channel on which the operator is seeking to find a message to be searched is selected 56. The operator selects the time 58 for which a message is sought. For example, the operator could select the time of 5:13:02 on Sep. 23. The record session table is then referenced for the particular file mark. For example, with reference also to FIG. 3, the time of 5:13:02 would be during the second recording session 41. Because the second recording session began at 4:00 and the file mark number at the beginning of the session was 601, the file mark at 5:13:02 will be number 1331, plus an offset on two seconds. This is accomplished by dividing the time by six seconds to determine the file marks for the message. It will be recalled that each file mark represents six seconds. To find the message that follows a particular file mark requires that the time be divided by 6 to find the file mark and the remainder yields the location of the group in which the message starts. In this case, 5:13:02, since the remainder is two seconds, the message would start in the second group. Upon the location being determined, a high speed search is made 64 to the location of the tape. Once the tape has been positioned, the message is then played 68.

Thus, what has been shown and described is a fast and accurate method for finding a message from a DAT for a particular time and channel.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A method for searching a digital audio tape (DAT) for a message, the steps comprising:
   a) providing audio to a digital audio tape,
   b) dividing the tape into fixed time increments by writing on the tape one file mark for each time increment, wherein varying amounts of audio are contained in each time increment,
   c) creating a record session table that stores the time audio is recorded on the digital audio tape relative to the time increments,
   d) scanning the record session table to find audio at a selected time,
   e) positioning the tape at its location corresponding to the selected time, and
   f) playing the digital tape.

2. The method of claim 1 further including identifying in the record session table the channels for which audio was written on the DAT.

3. The method of claim 1 wherein the step of dividing the DAT into time increments includes dividing the DAT into a sequence of frames with each frame having a file mark and at least one group of audio data following each file mark and correlating the time of a session to file mark numbers.

4. The method of claim 3 further including the step of assigning a selected period for each file mark.

5. A method for searching for a message on a digital audio tape (DAT) that has the capability of receiving audio from a plurality of channels when recording in a digital audio logger, the steps comprising:
   a) recording audio in a primary partition of the DAT,
   b) dividing the primary partition of the DAT into file marks, equally spaced in time and not in distance where each file mark represents a period of varying amounts recording,
   c) creating a record session table in a secondary portion of the DAT that correlates the presence of audio and absence of audio on a plurality of channels,
   d) scanning the record session table to find the file mark numbers for a given period, and
   e) determining the file mark for a selected time.

6. The method of claim 5 further including the step of positioning the DAT for the selected time.

* * * * *